(12) United States Patent
Niu et al.

(10) Patent No.: US 9,049,090 B2
(45) Date of Patent: Jun. 2, 2015

(54) METHODS AND SYSTEMS FOR FINE TIMING SYNCHRONIZATION

(71) Applicant: Amlogic Co., Ltd., Santa Clara, CA (US)

(72) Inventors: Jin Niu, Shanghai (CN); Jinhong Zhang, Santa Clara, CA (US)

(73) Assignee: Amlogic Co., Ltd., Santa Clara, CA (US)

( * ) Notice: Subject to any disclaimer, the term of this patent is extended or adjusted under 35 U.S.C. 154(b) by 0 days.

(21) Appl. No.: 14/042,584

(22) Filed: Sep. 30, 2013

(65) Prior Publication Data

US 2015/0092891 A1    Apr. 2, 2015

(51) Int. Cl.
*H04L 27/06*    (2006.01)
*H04L 27/26*    (2006.01)

(52) U.S. Cl.
CPC .......... *H04L 27/2665* (2013.01); *H04L 27/265* (2013.01); *H04L 27/2695* (2013.01); *H04L 27/26* (2013.01); *H04L 27/2672* (2013.01); *H04L 27/2671* (2013.01)

(58) Field of Classification Search
CPC . H04L 27/2665; H04L 27/2695; H04L 27/26; H04L 27/265; H04L 27/2671; H04L 27/2672
See application file for complete search history.

(56) References Cited

U.S. PATENT DOCUMENTS 8,229,011 B2 *    7/2012    Xu ................................ 375/260

* cited by examiner

*Primary Examiner* — Rahel Guarino
(74) *Attorney, Agent, or Firm* — Venture Pacific Law, PC

(57) ABSTRACT

A method for determining timing synchronization for demodulating a signal by a receiver, comprises the steps of: generating a channel response for the signal; transforming the signal into the time domain using an inverse fast fourier transform ("IFFT"); determining a signal power for the transformed signal as a function of the generated channel response; and calculating the timing synchronization by the receiver as a function of the determined signal power.

10 Claims, 5 Drawing Sheets

METHODS AND SYSTEMS FOR FINE TIMING SYNCHRONIZATION

FIELD OF INVENTION

This invention relates to methods and systems for channel estimation for demodulating an orthogonal frequency division multiplexing ("OFDM") signal, and, in particular, to methods and systems for timing synchronization for an OFDM signal.

BACKGROUND

Orthogonal frequency division multiplexing system is a multi-carrier transmission technique that uses orthogonal subcarriers to transmit information within an available spectrum. Since the subcarriers are orthogonal to one another, the subcarriers can be spaced much more closely together within an available spectrum than, for example, the individual channels in a conventional frequency division multiplexing ("FDM") system. Many modern digital communications systems are turning to the OFDM system as a modulation scheme for signals that need to survive in environments having multipath-propagation or strong interference, including the IEEE 802.11a standard, the Digital Video Broadcasting Terrestrial ("DVB-T") standard, the Digital Video Broadcasting Handheld ("DVB-H") standard, the Digital Audio Broadcast ("DAB") standard, and the Digital Television Broadcast ("T-DMB") standard.

In an OFDM system, the subcarriers may be modulated with a low-rate data stream before transmission. It is advantageous to transmit a number of low-rate data streams in parallel instead of a single high-rate stream since low symbol-rate schemes suffer less inter-symbol interference ("ISI") caused by multipath.

OFDM modulated signals can be transmitted in transmission frames, where each transmission frame consists of a number of symbols. The reception of these signals depends on successful acquisition of symbol timing and frame timing. Symbol timing acquisition can be accomplished by finding the boundary of each symbol; whereas frame timing acquisition can be accomplished by finding the starting symbol of each transmission frame.

In particular, with respect to OFDM modulated signals, timing synchronization and frequency synchronization are difficult. It is difficult to exactly synchronize symbols between the transmitter and the receiver. Timing synchronization requires that the beginning of each OFDM symbol be determined within each frame. Unless the correct timing is known, the receiver cannot remove cyclic prefixes at the correct timing instance. Thus, individual symbols cannot be correctly separated before a Fast Fourier Transform ("FFT") is applied to demodulate the signal.

In a wireless environment with multipath reception, finding the optimal FFT window timing can result in the lowest inter-symbol-interference ("ISI"), and therefore the best receiver performance. Fine timing synchronization serves this purpose. To find the timing window, i.e., the start of an FFT window, a conventional method is to locate the strongest path via a time domain correlation or inverse FFT and then place the FFT window a few samples shift from the strongest path. In an additive white Gaussian noise ("AWGN") environment, this scheme works just fine since the delay is very limited. However, in a dynamic environment with various multipath delays and multipath profiles, such methods are not adequate. Therefore, it is desirable to provide methods for timing synchronization for OFDM modulated signals.

SUMMARY OF INVENTION

An object of this invention is to provide methods and systems for fine timing synchronization to aid in processing a received signal that can account for multipath delays.

Another object of this invention is to provide methods and systems for fine timing synchronization to aid in processing a received signal that can account for various signal profiles.

Yet another object of this invention is to provide methods and systems for fine timing synchronization for a signal having improved performance.

Briefly, the present invention discloses methods for determining timing synchronization for demodulating a signal by a receiver, comprising the steps of: generating a channel response for the signal; transforming the signal into the time domain using an inverse fast fourier transform ("IFFT"); determining a signal power for the transformed signal as a function of the generated channel response; and calculating the timing synchronization by the receiver as a function of the determined signal power.

An advantage of this invention is that methods and systems for fine timing synchronization are provided to aid in processing a received signal that can account for multipath delays.

Another advantage of this invention is that methods and systems for fine timing synchronization are provided to aid in processing a received signal that can account for various signal profiles.

Yet another advantage of this invention is that methods and systems for fine timing synchronization for a signal having improved performance are provided.

DESCRIPTION OF THE DRAWINGS

The foregoing and other objects, aspects, and advantages of the invention can be better understood from the following detailed description of the preferred embodiment of the invention when taken in conjunction with the accompanying drawings in which.

DETAILED DESCRIPTION OF THE PREFERRED EMBODIMENTS

In the following detailed description of the embodiments, reference is made to the accompanying drawings, which form a part hereof, and in which is shown by way of illustration of specific embodiments in which the present invention may be practiced.

Figure 1:
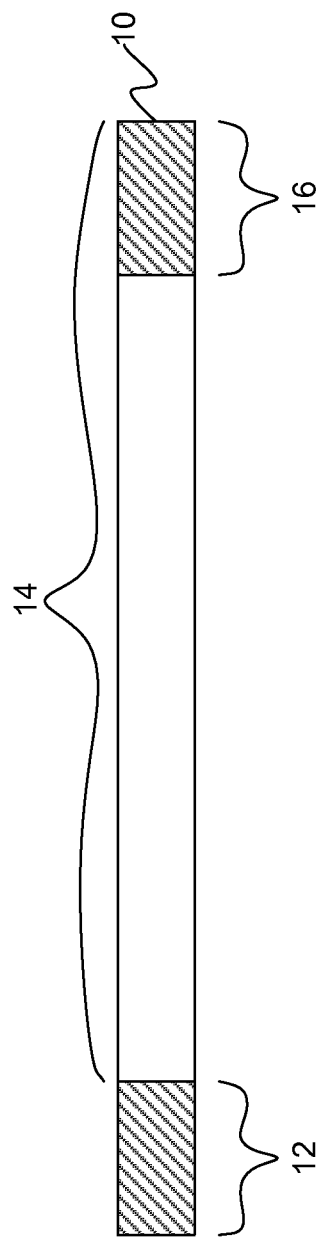
FIG. 1 illustrates an OFDM frame having a cyclic prefix and a body.

FIG. 1 illustrates an OFDM frame having a cyclic prefix ("CP") and a body. A symbol 10 can have a CP 12 having a length of Ncp points and a body 14 having a length of N points. The CP 12 is a copy of a latter portion 16 of the body 14 of the symbol 10 that is appended to the beginning of the symbol body 14. The CP 12 can serve as a buffer to avoid inter-symbol interference. Typically, the CP 12 is discarded when decoding the symbol 10. For instance, the CP 12 should be removed before applying FFT demodulation during the decoding of the symbol 10.

Figure 2:
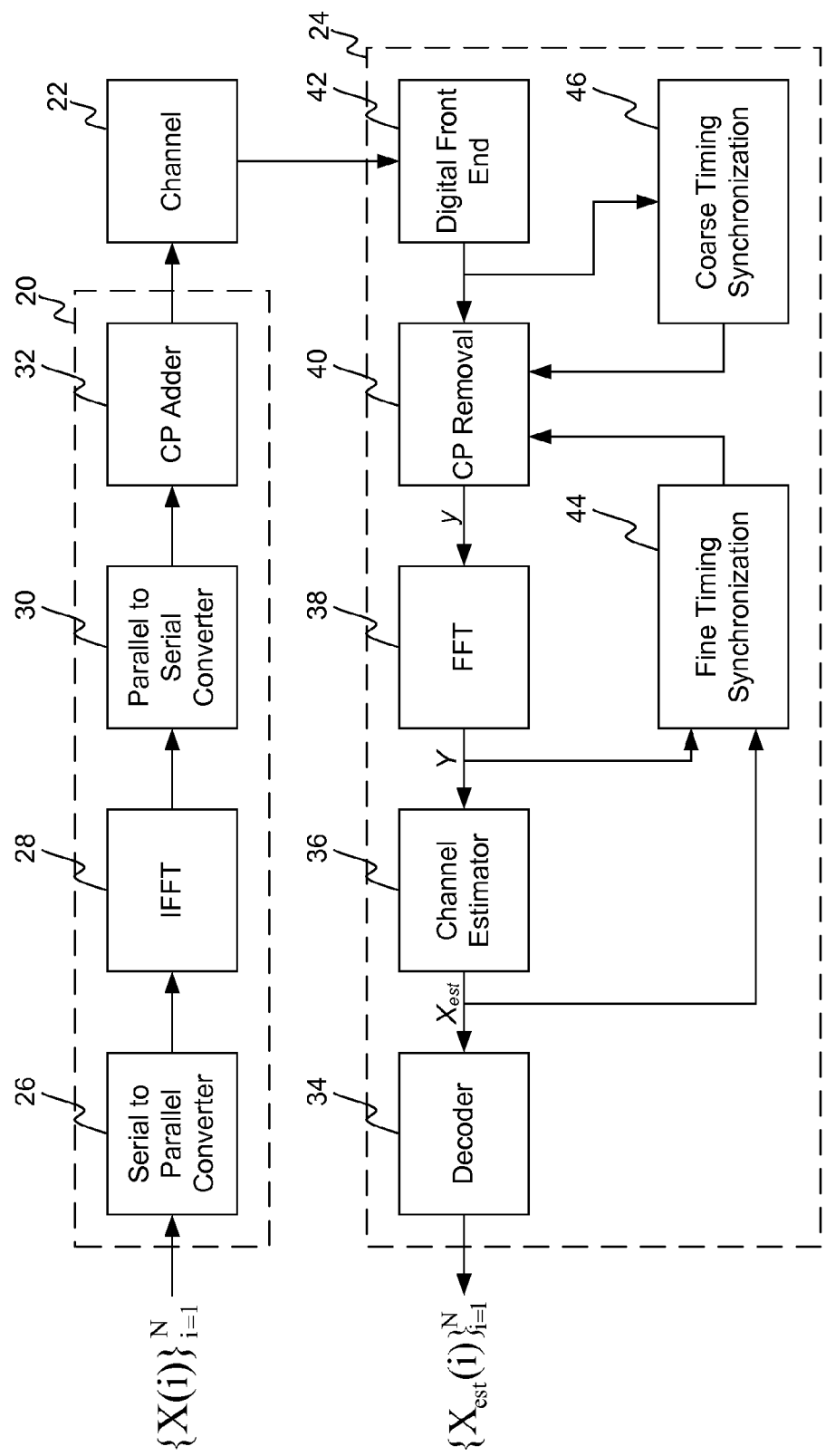
FIG. 2 illustrates a block diagram of a communications system of the present invention.

FIG. 2 illustrates a block diagram of a communications system of the present invention. A signal is inputted to a transmitter 20 for transmission over a channel 22, e.g., over-the-air wireless channel. The transmission can be received by a receiver 24 for processing and decoding.

The transmitter 24 comprises a serial-to-parallel converter 26, an inverse fast Fourier transform ("IFFT") block 28, a parallel-to-serial converter 30, and a CP adder block 32. The transmitter 24 may also comprise other blocks for transmitting the signal over the channel 22. However, to aid in the understanding of the invention, the above listed blocks are used to illustrate several key blocks of the transmitter 24. It is understood by a person having ordinary skill in the art that a transmitter (or receiver) of the present invention can have other blocks for transmitting or receiving the signal.

The receiver 24 can comprise a digital front end block 42, a CP removal block 40, a Fast Fourier Transform ("FFT") block 38, a channel estimator 36, a decoder 34, a fine timing synchronization block 44, and a coarse timing synchronization block 46. The received signal from the channel 22 can be processed by the receiver 24 by first being processed by the digital front end block 42. The digital front end block 42 processes the received signal from an analog signal to a digital signal yy having a predefined sampling rate. The digital signal yy can be outputted to the CP removal block 40 and the coarse timing synchronization block 46. The coarse timing synchronization block 46 can estimate various errors of the digital signal yy and make any corrections as necessary. In particular, the coarse timing synchronization block 46 can estimate the coarse timing for the receiver 24. The coarse timing can provide the receiver 24 with useful timing information for applying a first FFT on the received signal.

The CP removal block 40 receives the digital signal yy, a coarse timing synchronization, and a fine timing synchronization to accurately remove the CP from the digital signal yy. The CP removal block 40 outputs the signal y (that is the digital signal without the CP) to the FFT block 38. The FFT block 38 performs a FFT operation on the signal y to covert the signal y from the time domain signal to a frequency domain signal Y. The frequency domain signal is outputted to the channel estimator 36. The channel estimator 36 performs channel estimation on the signal Y to generate a channel frequency response H to generate the estimated symbols $X_{est}$. The estimated symbols $X_{est}$ are outputted to the decoder 34 for further processing.

The frequency domain signal Y and the estimated symbol $X_{est}$ are inputted to the fine timing synchronization block 44 for generating a fine timing value. The fine timing value provides the correct starting position of the FFT window for the signal to remove the CP. Thus, the CP removal block 40 can use the fine timing value to accurately delete the CP from the signal y.

Figure 3:
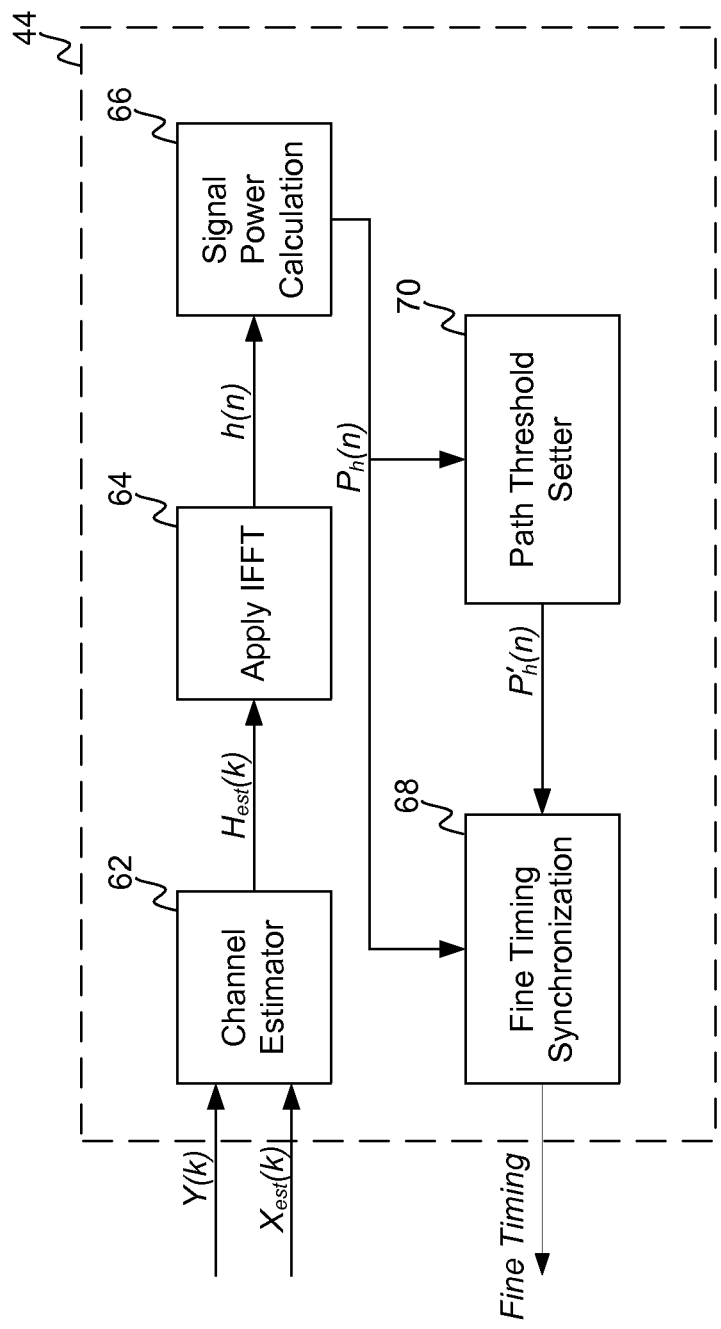
FIG. 3 illustrates a block diagram of a fine timing synchronization block of the present invention.

FIG. 3 illustrates a block diagram of a fine timing synchronization block of the present invention. The fine timing synchronization block 44 of the present invention comprises a channel estimator 62, an IFFT block 64, a signal power calculation block 66, a path threshold setter 70, and a fine timing synchronization block 68. The channel estimator 62 receives the signal Y(k) in the frequency domain and the estimated symbols $X_{est}(k)$ for the signal to generate an estimated channel response $H_{est}(k)$ in the frequency domain, where k is the frequency carrier number. The estimated channel response $H_{est}(k)$ can be found by the following equation:

$$H_{est}(k) = Y(k)/X_{est}(k), \quad \text{Equation [1]}$$

where k is the frequency carrier number.

The IFFT block 64 receives the estimated channel response $H_{est}(k)$ and applies an IFFT on the received channel response $H_{est}(k)$ to convert the channel response to the time domain, $h_{est}(n)$, wherein n is the index number. The channel response, $h_{est}(n)$, in the time domain is then inputted to the signal power calculation block 66 to calculate the power of the signal $P_h(n)$, also referred to as the signal power. The signal power $P_h(n)$ can be calculated by the following equation:

$$P_h(n) = \left[\text{abs}\left(h\left(\text{mod}\left(n - \frac{N}{2}, N\right)\right)\right)\right]^2, \quad \text{Equation [2]}$$

where mod(a,b) is the modulo operator and N is a FFT length. The signal power $P_h(n)$ is inputted to the path threshold setter 70 and the fine timing synchronization block 68.

The path threshold setter 70 sets values of the signal power $P_h(n)$ below a predefined threshold to zero. This is done to eliminate possible noise from being introduced into the calculation for fine timing synchronization. Thereby, only the signal power values above a certain threshold are used for the fine timing synchronization block 68. The filtered signal power can be denoted by the following equation:

$$\hat{P}_h(n) = \begin{cases} P_h(n), & \text{for } P_h(n) \geq \text{path threshold} \\ 0, & \text{for } P_h(n) < \text{path threshold} \end{cases} \quad \text{Equation [3]}$$

The fine timing synchronization block 68 uses the signal power $\hat{P}_{\hat{h}}(n)$ to calculate a fine timing value to indicate the start of the FFT window for demodulating of the signal.

The fine timing for the FFT window can equal the following:

$$\text{fine timing} = \text{argmin}_{idx} \text{abs}\left(\left(\sum_{r=0}^{idx-1} \hat{P}_h(r)\right) - \left(\sum_{r=idx+Ncp}^{N-1} \hat{P}_h(r)\right)\right) \quad \text{Equation [4]}$$

where min is the minimum function, abs is an absolute value function, idx is an index, N is a body length of a frame of a signal, and Ncp is a cyclic prefix length of the frame of a signal, and $\hat{P}_{\hat{h}}(n)$ is the filtered signal power. The index idx can start from a maximum index, in which a maximum power value for the determined signal power is located at the maximum index. Also, the index idx may start at other values until a minimum is found for the minimum function in Equation [4].

Figure 4:
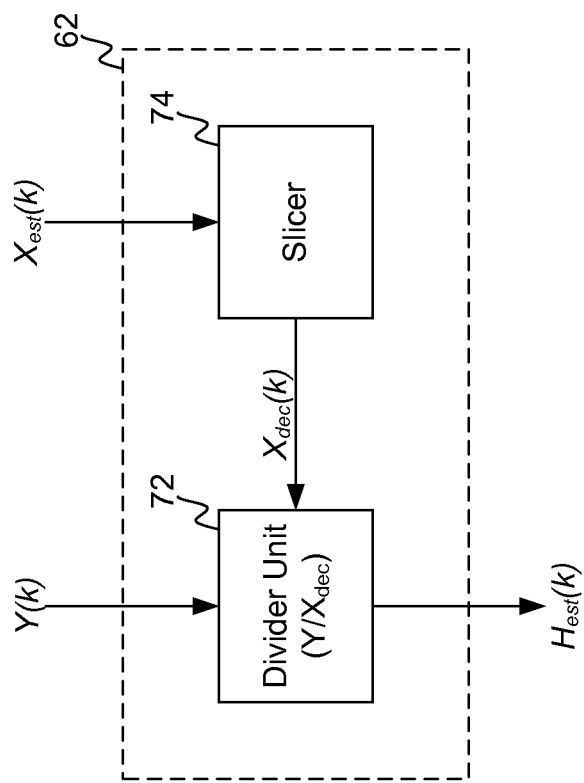
FIG. 4 illustrates a block diagram of a channel response block of the present invention.

FIG. 4 illustrates a block diagram of a channel response block of the present invention. The channel response block 62 of the present invention comprises a divider unit 72 and a slicer 74. The signal Y(k) and a hard decision symbol $X_{dec}$ are inputted to the channel estimator 62. The slicer 74 receives an estimated symbol $X_{est}$, which is demapped to generate the hard decision symbol $X_{dec}$. The signal Y(k) and the hard decision symbol $X_{dec}$ are inputted to the divider unit 72. The divider unit 72 divides the signal Y(k) by the hard decision symbol $X_{dec}$ to determine an estimated channel response $H_{est}(k)$.

Figure 5:
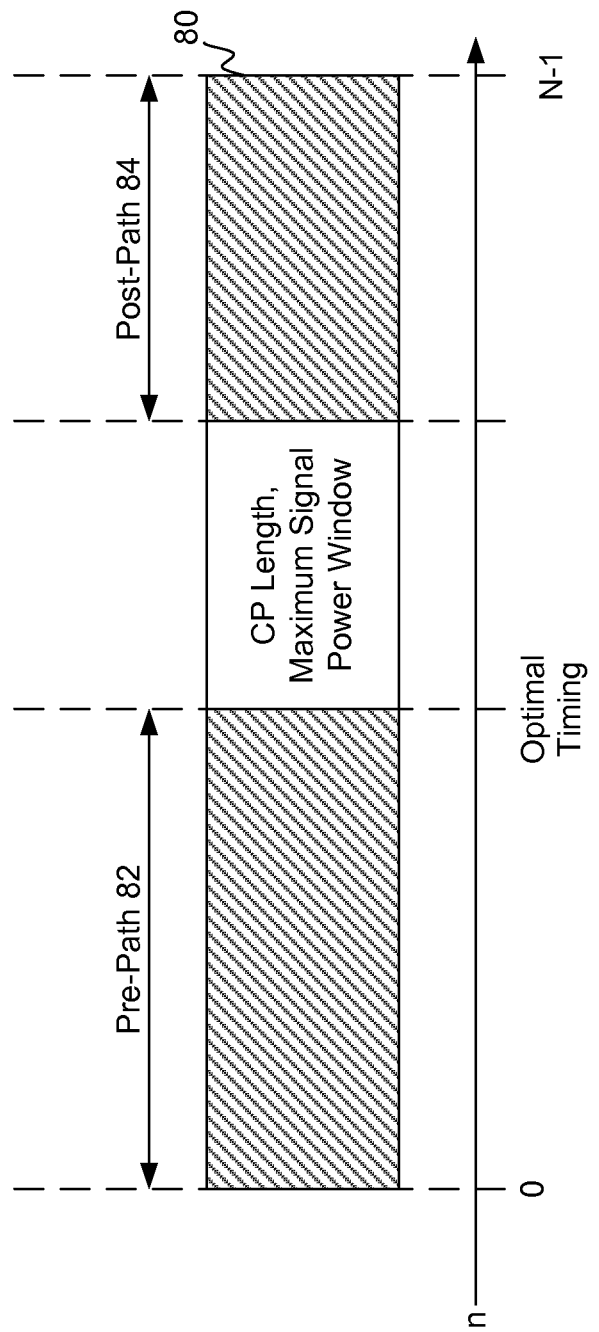
FIG. 5 illustrates a diagram in which optimal timing for a FFT window is found for a frame of a signal.

FIG. 5 illustrates a diagram in which optimal timing for a FFT window is shown for a frame of a signal. A frame 80 of the signal can start at an index labeled n=0 and end at the index n=N−1, where N is the FFT length. The minimum value of the absolute difference of the following two items:

(1) the sum of the signal powers $P_h(n)$ for n=0, 1, 2, ... optimal_timing, in a pre-path 82; and (2) the sum of the signal powers $P_h(n)$ for n= ... N−2, N−1, in a post-path 84, can be used to determine an optimal timing index for the FFT window. The optimal timing index is when n=optimal_timing. The index of the post-path can start at the optimal timing plus the cyclic prefix length Ncp. Furthermore, the optimal timing minus N/2 can signify the start of the FFT window since there is an N/2 shift from Equation [2].

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred apparatuses, methods, and systems described herein, but all those other and further alterations and modifications as would be apparent to those of ordinary skilled in the art.

We claim:

1. A method for determining timing synchronization for demodulating a signal by a receiver, comprising the steps of:
   generating a channel response for the signal;
   transforming the signal into the time domain using an inverse fast fourier transform ("IFFT");
   determining a signal power for the transformed signal as a function of the generated channel response; and
   calculating the timing synchronization by the receiver as a function of the determined signal power, comprising the substeps of:
      determining a first summation value for a first selected range of the determined signal power;
      determining a second summation value for a second selected range of the determined signal power; and
      determining a minimum index for the signal as a function of the first summation value and the second summation value,
   wherein, at the minimum index, the absolute value of the difference between the first summation value and the second summation value is minimized and is used as the timing synchronization.

2. The method of claim 1 wherein the generated channel response is a function of the signal and an estimated symbol for the signal.

3. The method of claim 1 wherein a maximum index is determined for the signal, wherein a maximum power value for the determined signal power is located at the maximum index, wherein the signal has an index reference starting from zero to N, wherein the first selected range of the first summation value starts from zero to the maximum index minus one, and wherein the second selected range of the second summation value starts from the maximum index plus a cyclic prefix length to N−1.

4. The method of claim 3 wherein the minimum index is equal to $$\min_{idx} \text{abs}\left(\left(\sum_{r=0}^{idx-1} \hat{P}_h(r)\right) - \left(\sum_{r=idx+Ncp}^{N-1} \hat{P}_h(r)\right)\right),$$

wherein idx is an index of the signal, the cyclic prefix length is $N_{cp}$, and $P_h(r)$ is the determined signal power as a function of the index of the signal.

5. The method of claim 1 wherein, after the determining step and before the calculating step, comprising the step:
   setting the determined signal power to zero for signal power values below a predefined threshold.

6. A method for determining timing synchronization for demodulating a signal by a receiver, comprising the steps of:
   generating a channel response for the signal, wherein the generated channel response is a function of the signal and an estimated symbol for the signal;
   transforming the signal into the time domain using an inverse fast fourier transform ("IFFT");
   determining a signal power for the transformed signal as a function of the generated channel response;
   setting the determined signal power to zero for signal power values below a predefined threshold; and
   calculating the timing synchronization by the receiver as a function of the determined signal power, comprising the substeps of:
      determining a first summation value for a first selected range of the determined signal power;
      determining a second summation value for a second selected range of the determined signal power; and
      determining a minimum index for the signal as a function of the first summation value and the second summation value,
   wherein, at the minimum index, the absolute value of the difference between the first summation value and the second summation value is minimized and is used as the timing synchronization.

7. The method of claim 6 wherein a maximum index is determined for the signal, wherein a maximum power value for the determined signal power is located at the maximum index, wherein the signal has an index reference starting from zero to N, wherein the first selected range of the first summation value starts from zero to the maximum index minus one, and wherein the second selected range of the second summation value starts from the maximum index plus a cyclic prefix length to N−1.

8. The method of claim 6 wherein the minimum index is equal to $$\min_{idx} \text{abs}\left(\left(\sum_{r=0}^{idx-1} \hat{P}_h(r)\right) - \left(\sum_{r=idx+Ncp}^{N-1} \hat{P}_h(r)\right)\right),$$

wherein idx is an index of the signal, the cyclic prefix length is $N_{cp}$, and $P_h(r)$ is the determined signal power as a function of the index of the signal.

9. A method for determining timing synchronization for demodulating a signal by a receiver, comprising the steps of:
   generating a channel response for the signal, wherein the generated channel response is a function of the signal and an estimated symbol for the signal;
   transforming the signal into the time domain using an inverse fast fourier transform ("IFFT");
   determining a signal power for the transformed signal as a function of the generated channel response;
   setting the determined signal power to zero for signal power values below a predefined threshold; and
   calculating the timing synchronization by the receiver as a function of the determined signal power, comprising the steps:

determining a first summation value for a first selected range of the determined signal power;

determining a second summation value for a second selected range of the determined signal power; and determining a minimum index for the signal as a function of the first summation value and the second summation value, wherein, at the minimum index, the absolute value of the difference between the first summation value and the second summation value is minimized and is used as the timing synchronization, wherein the minimum index is equal to $$\min_{idx} \text{abs}\left(\left(\sum_{r=0}^{idx-1} \hat{P}_h(r)\right) - \left(\sum_{r=idx+Ncp}^{N-1} \hat{P}_h(r)\right)\right),$$

and wherein idx is an index of the signal, the cyclic prefix length is $N_{cp}$, and $P_h(r)$ is the determined signal power as a function of the index of the signal.

10. The method of claim 9 wherein a maximum index is determined for the signal, wherein a maximum power value for the determined signal power is located at the maximum index, wherein the signal has an index reference starting from zero to N, wherein the first selected range of the first summation value starts from zero to the maximum index minus one, and wherein the second selected range of the second summation value starts from the maximum index plus a cyclic prefix length to N−1.

* * * * *